United States Patent
Anderson et al.

(10) Patent No.: US 6,534,030 B2
(45) Date of Patent: Mar. 18, 2003

(54) PROCESS FOR PRODUCING AMMONIUM THIOSULFATE

(75) Inventors: Mark C. Anderson, Spring, TX (US); Sidney P. White, Ft. Collins, CO (US); Ronald E. Shafer, Overland Park, KS (US)

(73) Assignee: El Paso Merchant Energy Petroleum Company, Houston, TX (US)

( * ) Notice: Subject to any disclaimer, the term of this patent is extended or adjusted under 35 U.S.C. 154(b) by 0 days.

(21) Appl. No.: 09/808,618

(22) Filed: Mar. 14, 2001

(65) Prior Publication Data

US 2002/0131927 A1 Sep. 19, 2002

(51) Int. Cl.$^7$ ............................................... C01B 17/64
(52) U.S. Cl. ...................... 423/514; 423/220; 423/222; 423/237; 423/238; 423/243.01; 423/243.06
(58) Field of Search ................................ 423/220, 222, 423/237, 238, 243.01, 243.06, 514

(56) References Cited

U.S. PATENT DOCUMENTS

| | | | |
|---|---|---|---|
| 3,431,070 A | 3/1969 | Keller | ........................ 23/115 |
| 3,937,793 A | 2/1976 | Metzger et al. | ............. 423/514 |
| 6,159,440 A | * 12/2000 | Schoubye | ................... 423/514 |

OTHER PUBLICATIONS

Perry et al. (Editors) *Chemical Engineers' Handbook* (5th Ed.) McGraw–Hill Book Co., USA, ISBN 0–07–049478–9, pp. 18–90 to 18–92, 1973.*

Reginald I. Berry (Editor) "Treating Hydrogen Sulfide: When Claus is not Enough" *Chem. Eng.* Oct. 6, 1980, pp. 92 & 93.*

* cited by examiner

*Primary Examiner*—Stanley S. Silverman
*Assistant Examiner*—Timothy C. Vanoy
(74) *Attorney, Agent, or Firm*—Gardere Wynne Sewell LLP; Jennifer S. Sickler

(57) ABSTRACT

A process for producing ammonium thiosulfate by contacting a feed gas containing hydrogen sulfide and ammonia with an aqueous absorbing stream containing ammonium sulfite and ammonium bisulfite to form an ammonium thiosulfate-containing solution; the absorption being controlled by monitoring the oxidation reduction potential of the absorbing stream and varying the feed rates in response to the oxidation reduction potential measurements. An ammonium bisulfide-containing aqueous stream is contacted with and absorbs sulfur dioxide to form an aqueous stream containing the ammonium sulfite and ammonium bisulfite reagents. This sulfite/bisulfite-containing stream is combined with the ammonium thiosulfate-containing solution in a vessel to produce a combined solution. A portion of the combined solution is recycled back to contact the feed gas and ammonium thiosulfate is recovered from the remaining portion of the combined solution.

13 Claims, 1 Drawing Sheet

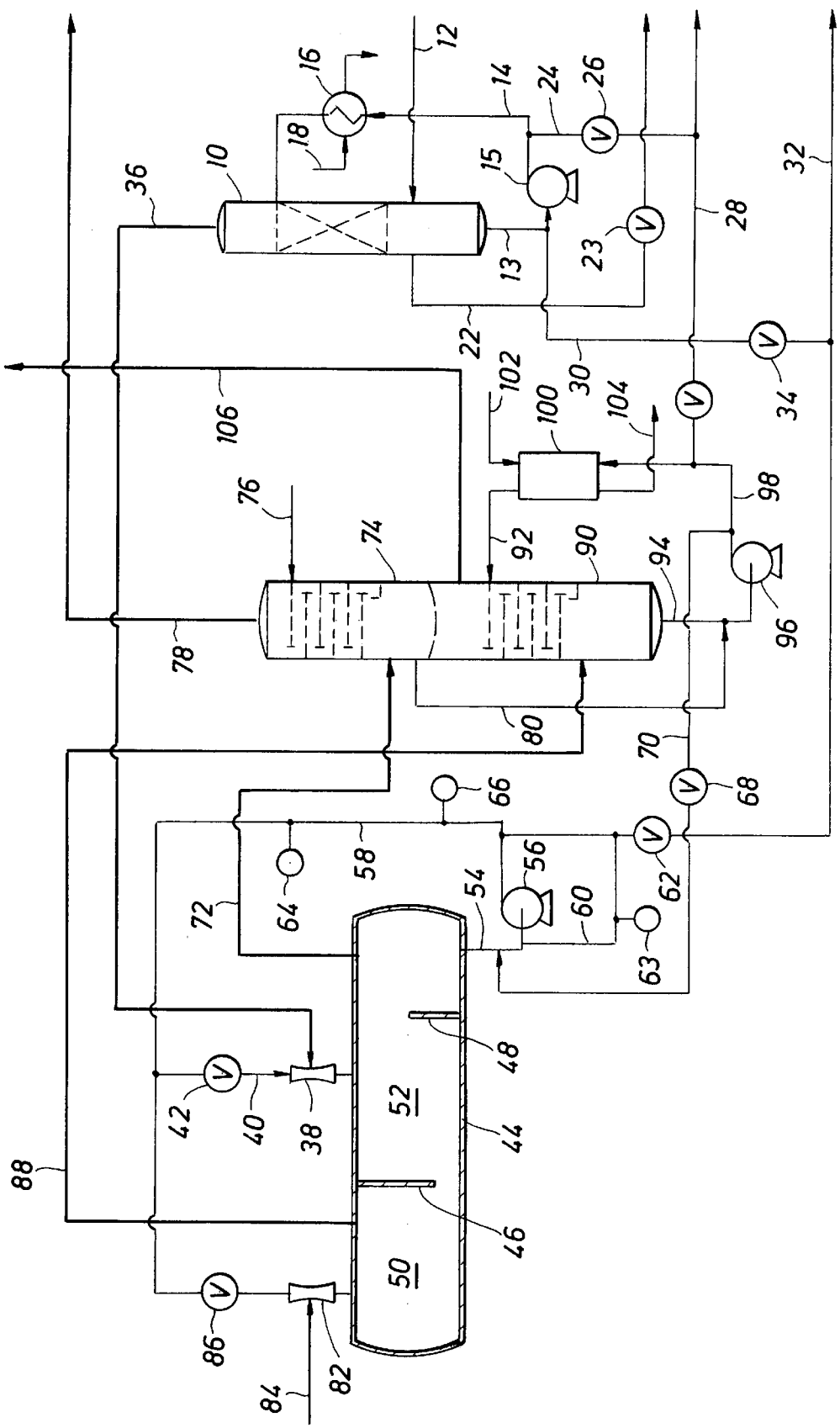

PROCESS FOR PRODUCING AMMONIUM THIOSULFATE

BACKGROUND OF THE INVENTION

1. Field of the Invention

The present invention relates to a process for the production of ammonium thiosulfate and, more particularly, a process for producing ammonium thiosulfate from a feed gas stream containing a mixture of ammonia and hydrogen sulfide.

2. Description of the Prior Art

Ammonia and hydrogen sulfide gases are frequently found together in mixtures with water or other gaseous components. Such mixtures are often a by-product of petroleum refining and chemical process, particularly where crude oils and feedstocks containing nitrogen and sulfur compounds are processed. Not only can ammonia and hydrogen sulfide occur naturally in the raw material, they can also be produced as decomposition products from such processes as distillation, cracking, and coking. The nitrogen and sulfur content of a feed material can be reduced by conversion to ammonia and hydrogen sulfide in catalytic hydrogen treating processes such as hydrodesulfurization, hydrocracking, and reforming. Mixtures of ammonia and hydrogen sulfide can also result from processes such as ore reduction, metal refining, papermaking, and coal distillation.

These by-product gases were once considered waste and either incinerated or burned in combustion furnaces to recover their fuel value. Even so, combustion is not a desirable means of disposal, as the oxides of nitrogen and sulfur produced and found in the flue gases are corrosive, cause unsightly stack plumes, and contribute to atmospheric pollution.

Ammonia and hydrogen sulfide are also found in sulfidic waters produced from such processes or are obtained by scrubbing the aforementioned gases to remove the ammonium and hydrogen sulfide therefrom. In the past, waste sulfidic waters were frequently disposed of by discharging them to streams, rivers, lakes, oceans, or other convenient bodies of water.

Out of growing concern for water and air pollution, coupled with stringent regulations regarding plant water and gaseous effluent quality, various processes have been developed to treat these by-product effluent streams. Stripping of the noxious ammonia and hydrogen sulfide from the sulfidic waters has been used to improve the quality of effluent waters; however, the stripped gases, commonly referred to as sour water stripper off gas (SWSG) still present a disposal problem. Most prior art processes that have dealt with the SWSG stream have either been complicated, required extensive plant investment, entailed high operating costs, failed to produce a readily marketable product for which a reasonably stable demand existed, or were unsuitable for the treatment of relatively small or intermittent by-product streams. Although some of these processes provide a suitable means of disposing of the by-product effluents, they fail to yield products of commercial value.

It clearly would be desirable to have a method for processing a gas stream containing ammonia and hydrogen sulfide whereby a salable product could be produced. To this end, U.S. Pat. No. 3,431,070 discloses a process for treating ammonia and hydrogen sulfide gas mixtures to produce ammonium thiosulfate and sulfur, the sulfur typically being present in the aqueous ammonium thiosulfate solution as finely divided crystals.

SUMMARY OF THE INVENTION

It is therefore an object of the present invention to provide a process for recovering the value of the ammonia present in an SWSG by converting it to ammonium thiosulfate, a readily marketable chemical.

Another object of the present invention is to provide a process for producing ammonium thiosulfate from a gas mixture comprising ammonia and hydrogen sulfide by utilizing the ammonia therein without the necessity of separating it from the other components of the mixture and without the need for ammonia from any additional source.

Still a further object of the present invention is to provide a process for the production of ammonium thiosulfate from a gas mixture comprising ammonia and hydrogen sulfide wherein hydrogen sulfide in excess of stoichiometric requirements is selectively rejected as an off-gas stream essentially free of ammonia and sulfur dioxide.

Yet another object of the present invention is to provide a process for producing ammonium thiosulfate from a gas mixture comprising ammonium and hydrogen sulfide wherein an effluent stream from the process, whether gaseous or liquid, does not adversely affect the environment or subsequent downstream processes.

According to the process of the present invention, a feed gas mixture comprising hydrogen sulfide and ammonia is contacted, preferably in a spray-type absorber, with an aqueous absorbing stream comprising ammonium thiosulfate, ammonium bisulfate, and ammonium sulfite in a first reaction zone. The contacting is conducted under conditions that limit the conversion of sulfite to thiosulfate and produces an ammonia-rich absorbing stream that has a lower concentration of sulfite—i.e., a sulfite-lean stream. Unreacted hydrogen sulfide is rejected from the ammonia-rich absorbing stream in the first reaction zone, producing or leaving a liquid, first reaction zone product free of unabsorbed gases. Sulfur dioxide gas from a suitable sulfur dioxide-containing gas stream is absorbed in the ammonia-rich absorbing stream in the absence of any substantial quantity of hydrogen sulfide in a second reaction zone to produce a second reaction zone product free of unabsorbed gases. At least a portion of the second reaction zone product is recycled to the first reaction zone. An aqueous product stream of ammonium thiosulfate is recovered from one of the first or second reaction zone products.

In the process of the present invention, by limiting the conversion of sulfite to thiosulfite, there is produced a stream with a lower concentration of sulfite, the unreacted hydrogen sulfide being rejected from the sulfite-lean stream in the first reaction zone. The sulfite-lean stream from the first reaction zone is passed to a second reaction zone wherein it contacts a gaseous stream containing $SO_2$ that is absorbed from the gaseous stream, converting sulfite ion to bisulfite.

BRIEF DESCRIPTION OF THE DRAWINGS

The single FIGURE is a schematic diagram of the process of the present invention.

DESCRIPTION OF THE PREFERRED EMBODIMENT

While the present invention will be described with particular application to the use of an SWSG stream as the feed gas mixture used in the process of the present invention, it is to be understood that it is not so limited and that the feed gas mixture can be any mixture of ammonia and hydrogen sulfide, in which the mol ratio of ammonia to hydrogen sulfite is no greater than 3, and which can contain other gases as well as certain entrained liquids, regardless of the source of such feed gas. A typical SWSG stream generally contains equal molar concentrations of ammonia, hydrogen sulfide, and water vapor. Consequently, the hydrogen sulfide is present in quantities in excess of that required to produce ammonium thiosulfate according to the following, well-known, equation:

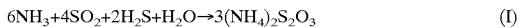
$$6NH_3 + 4SO_2 + 2H_2S + H_2O \rightarrow 3(NH_4)_2S_2O_3 \qquad (I)$$

Thus, to produce 1.0 moles of ammonium thiosulfate, 2.0 moles of ammonia, ⁴⁄₃ moles of sulfur dioxide, and ²⁄₃ moles of hydrogen sulfide are required.

With reference then to the FIGURE, a feed gas mixture, e.g., an SWSG stream, enters a pre-scrubber column 10 via a line 12. Pre-scrubber column 10 can comprise any form of gas/liquid contacting device, preferably of the countercurrent variety, whereby the feed gas mixture entering pre-scrubber column 10 via line 12 is contacted with a prescrubber solution of ammonium thiosulfate or other suitable scrubbing medium introduced into pre-scrubber column 10 via line 14, stream 14 being heated in exchanger 16 via a steam source from line 18 and comprising a recycle stream 13 from pre-scrubber column 10 plus any make-up solution. Line 13, pump 15, and line 14 form a recycle loop of pre-scrubber column 10, make-up solution being added to the loop as needed. Prescrubber column 10 can operate at a temperature about the same as, or slightly above, the temperature of the SWSG stream in line 12, e.g., approximately 180° F., to avoid condensation and resultant accumulation of water. Exchanger 16 serves to ensure that the incoming pre-scrubber solution is maintained at a temperature slightly above that of the feed gas entering via line 12 so as to avoid accumulation of water in pre-scrubber column 10.

Pre-scrubber column 10 serves the function of removing trace amounts of impurities that could adversely affect the quality of the desired ammonium thiosulfate product. It is well known that SWSG streams may contain phenols, organic acids, hydrocarbons, and hydrogen cyanide, to mention just a few. Hydrogen cyanide can react with thiosulfate, producing thoicyanate, while organic acids and phenols can react with ammonia, producing high boiling point phenates and the corresponding salts of the acids. Accumulated hydrocarbons/oils are periodically removed from pre-scrubber column 10 by skimming the top of the aqueous pre-scrubber solution, the hydrocarbons/oils being removed from pre-scrubber column 10 via line 22 and valve 23 to be sent to waste or further treatment. A purge stream of pre-scrubber solution is periodically discharged from the recycle loop of pre-scrubber column 10 via line 24, valve 26, and line 28. Make-up thiosulfate solution recovered from thiosulfate product stream 32 is periodically introduced into the recycle loop of pre-scrubber column 10 via line 30 and valve 34.

Pre-scrubber column 10 can comprise any form of gas/liquid contactor, preferably of the countercurrent variety, and can employ trays, as well as structured or random packing. The pre-scrubber solution need not be aqueous ammonium thiosulfate but can be other solutions, depending upon the impurities present in the feed gas in line 12. Lastly, it is to be recognized that if the feed gas in line 12 contains no impurities that are deleterious to the process or the end product, the pre-scrubber 10 may be dispensed with in its entirety.

Pre-scrubbed gas is removed as an overhead fraction from pre-scrubber column 10 via line 36 and is introduced into a venturi scrubber 38, where it is contacted with an aqueous absorbing stream, introduced via line 40 through valve 42. The aqueous absorbing stream is comprised primarily of from 40 to 80 wt. % of dissolved ammonium thiosulfate (ATS) and from 0.5 to 8 wt. % of ammonium bisulfite (ABS) and ammonium sulfite (AS), as well as minor amounts of other salts of ammonia and sulfur species. The hydrogen sulfide and ammonia that are absorbed in venturi scrubber 38 react with the aqueous sulfite ions present in the absorbing stream introduced via line 40 per equation I above to produce ammonium thiosulfate. Since the reaction of hydrogen sulfide in the liquid phase to produce thiosulfate occurs instantaneously, it is necessary according to the process of the present invention to limit the conversion of the sulfite ion to the thiosulfate ion. If the reaction is allowed to go to completion, there will be no residual ammonia to absorb sulfur dioxide in the ABS absorber system, or the solution returned to the ABS absorber system will contain ammonium sulfide, which could possibly result in the release of hydrogen sulfide in downstream operations, a result that is to be avoided. As described more fully hereinafter, absorption of hydrogen sulfide can be controlled as a function of the vapor/liquid contact in scrubber 38, which in turn is varied depending on the redox potential in the absorbing stream entering scrubber 38 through line 40. On the other hand, absorption of ammonia in the absorber stream is almost complete, thereby producing an ammonia-rich absorbing stream.

The ammonia-rich absorbing stream from scrubber 38 is introduced into vessel 44. Vessel 44 contains an internal baffle system comprising a vapor barrier baffle 46 and a weir 48. In effect, vessel 44 defines a first chamber 50 having a gas space above to permit unabsorbed gases to disengage from the absorbing stream and a second chamber 52 also having a gas space above the liquids therein for disengagement of unabsorbed gases. It can thus be seen that liquid from chamber 50 can flow into chamber 52. An ammonium thiosulfate product stream is removed from chamber 52 of vessel 44 via line 54 and pump 56, one portion of the product stream passing through line 60 and valve 62 into line 32 for product recovery, and another portion of the product stream being recycled via line 58 to scrubber 38. An online pH probe 63 monitors the pH of a slip stream flowing through line 60 to ensure that the pH of the absorbing solution entering scrubber 38 via line 58, valve 42, and line 40 is from about 6.5 to about 8.0. Probe 63 is connected to a controller (not shown) that controls the addition of sulfur dioxide to the process to maintain the appropriate pH.

As noted above, it is important in the process of the present invention that absorption of hydrogen sulfide in scrubber 38 be carefully controlled so as to prevent complete conversion of sulfite ion to thiosulfate ion. As was also noted, this can be accomplished by controlling the liquid to gas ratio in scrubber 38, which in turn is adjusted in response to the redox potential of the absorbing stream in line 58. An oxidation reduction probe (ORP) 64 monitors the redox potential of the absorbing solution introduced into scrubber 38, ORP 64 serving ultimately to control, via a suitable control system, the amount of absorbing liquid passing through valve 42, thereby controlling the liquid to gas ratio in scrubber 38. An online specific gravity probe 66 determines the specific gravity of the absorbing stream passing through line 58. The probe 66 is connected to a valve 68 that periodically introduces a stream (hereinafter described) via line 70 to maintain the specific gravity in the desired range. As hereinafter described, the stream in line 70, while containing residual ammonium bisulfide/sulfide and thiosulfate, is relatively dilute and thereby serves as make-up water to control the specific gravity of the absorbing stream entering scrubber 38.

The off-gas from vessel 44 leaves chamber 52 of vessel 44 via line 72 and enters column 74, where it passes in countercurrent relationship to a water stream introduced via line 76. It is to be understood that the off-gas leaving vessel 44 through line 72 is essentially $H_2S$ and contains only minor amounts of ammonia, which is essentially completely removed in column 74, thereby leaving an off-gas passing from column 74 through line 78, which is essentially water-saturated hydrogen sulfide, which can be combusted to produce sulfur dioxide for use in the process or, if desired, can be directed to a Claus unit. Any hydrogen sulfide and ammonia absorbed in the water in column 74 is converted to ammonium bisulfide, which passes via line 80 out of column 74.

A gas stream of sulfur dioxide is introduced into venturi scrubber 82 via line 84, where it is contacted with the absorbing stream from line 58 via valve 86. In order to absorb sulfur dioxide in scrubber 82, it is essential that ammonia be present in the absorbing solution in line 58 as a mixture of ammonium bisulfite and sulfite. The sulfur dioxide introduced via line 84 can be from any source, e.g., combustion of sulfur or, as noted above, combustion of hydrogen sulfide removed from column 74 via line 78. It will also be appreciated that the sulfur dioxide produced by any such combustion process will typically contain significant amounts of nitrogen and oxygen. The effluent gas from chamber 50 of vessel 44 passes via line 88 to a column 90, where any remaining, unabsorbed sulfur dioxide is removed by countercurrent contact with a wash solution entering column 90 via line 92. The wash solution entering line 92 is comprised of the liquid effluent from column 74 via line 80, plus a recycle stream from column 90 via line 94, streams 80 and 94 being introduced via line 98 to a cooler 100, the hot liquid introduced into cooler 100 via line 98 being cooled by air or some suitable source introduced via line 102 and ejected from cooler 100 via line 104. The gas stream exiting column 90 via line 106 contains primarily nitrogen, oxygen, and water vapor with trace amounts of ammonia and sulfur dioxide. In this regard, it should be noted that the absorption of ammonia and sulfur dioxide and the conversion of ammonium sulfite to thiosulfate is exothermic. Accordingly, the off-gas leaving chamber 50 of vessel 44 will contain vaporized water, which may be condensed in column 90. As previously noted, the heat from the exothermic reaction is removed by exchange in cooler 100.

As was previously noted, specific gravity probe 66 controls valve 68 to permit the dilute stream in line 70 from the discharge of pump 96 to be used as make-up water to the absorbing stream in line 58 used in both scrubbers 38 and 82.

As discussed above, the process of the present invention is dependent upon limiting the conversion of sulfite ion to thiosulfate ion in the reaction between the feed gas mixture containing ammonia and hydrogen sulfide and the absorbing stream. The degree of conversion of ammonium sulfite to ammonium thiosulfate is indicated by the oxidation reduction potential (Redox Potential) of the absorbing stream or solution. In this case, the Redox Potential is determined by insertion of a platinum electrode in the absorbing stream and comparing its potential versus a Calomel reference electrode. More specifically, in this case, the Redox Potential ($E_m$) is given by the following Nerst Equation:

$E_m=E_o+RT/F\ (LN([SO_3^=]/[S_2O_3^=])-[4.6052\ RT/F\ (pH)]$ $[SO_3^=]$=Concentration of oxidized species, sulfite ion $[S_2O_3^=]$=Concentration of reduced species, thiosulfate ion $E_m$=Measured potential vs. reference electrode potential $E_o$=Half cell potential R=Gas constant, 1.98717 cal/deg mol F=Faraday's 23060.9 cal/volt equivalent T=Temperature, degrees Kelvin Experimental data has shown that the Redox Potential should be controlled in the range of −250 to −450 mv to ensure that residual ammonium sulfite/bisulfite remains in the absorbing stream. The process of the present invention is conducted such that the liquid to gas ratio (L/G) of the absorbing stream to the feed gas mixture is periodically adjusted so as to be from 1 gal.:100 SCF to 100 gal:100 SCF. It was found that increasing the liquid rate drives the Redox Potential more negative, resulting in the formation of ammonium sulfide in vessel 44. By varying the liquid rate of the absorbing solution, one limits the hydrogen sulfide absorption and, concomitantly limits the conversion of sulfite ion to thiosulfate. In this regard, and as previously pointed out, the reaction of hydrogen sulfide and the absorbing stream to produce thiosulfate is essentially instantaneous. Accordingly, control of the absorption of hydrogen sulfide must be maintained lest there be complete conversion of sulfite ion to thiosulfate.

Generally speaking, the absorbing stream used in the venturi scrubbers will have a composition comprising from about 40 to about 85 wt. % ATS and from about 0.5 to about 8 wt. % of a mixture of ABS and AS, it being understood that minor amounts of other salts of ammonia and sulfur species may also be present.

While the invention has been described above with respect to single-stage scrubbing of the $SO_2$ entering chamber 50 via line 84, it is to be understood that dualstage scrubbing could be employed. For example, vessel 44 could be modified to include a second baffle 46, effectively forming an additional chamber such as 50. With the addition of another venturi scrubber to the additional chamber, gas in the head space above the liquid would be returned to the additional venturi scrubber to be contacted with scrubbing solution from line 58.

While the process has been described above with respect to the use of venturi scrubbers, it is to be understood that other types of scrubbing devices or absorbers, generally of the spray type, can be employed. Spray-type absorbers or contacting units are desirable, since they are uniquely applicable to systems where high gas solubilities exists, such as, in this case, the absorption of hydrogen sulfide in the absorbing stream. Non-limiting examples of spray-type absorbers that can be used, in addition to the venturi scrubbers described above, include spray towers, cyclonic spray towers, and jet scrubbers. It is to be understood that other types of absorbing or gas/liquid contacting systems may be employed, provided that they can be controlled to limit the absorption of the hydrogen sulfide in the absorbing liquid. Thus, while some true countercurrent scrubbers might be employed, such units would have to be carefully designed, since they provide a large number of transfer units and could result in excessive absorption of hydrogen sulfide in the absorbing liquid.

While the process of the present invention has been described with respect to the venturi scrubbers being mounted on a horizontal vessel or drum 44, it will be recognized that scrubber 38 could be on the inlet to column 74, while scrubber 82 could be on the inlet to column 90. While not changing the overall process, this would allow column 74 to operate at a lower pressure than column 90, which would permit energy savings, which, under the embodiment shown, are required for combustion of air. SWSG streams are normally delivered at approximately 15 psig. By placing the venturi scrubbers on the column inlets, it would only be necessary to compress the air used for combustion to 2 to 5 psig rather than the 15+psig necessary, under the described, process, to keep the liquid level balance in the horizontal drum 44.

To more fully illustrate the present invention, the following non-limiting example is presented.

An SWSG stream containing 51 tons/day of ammonia and 102 tons/day of hydrogen sulfide is charged as a feed stream in line 12 to the process generally as set forth in the drawing. To provide sulfur dioxide, acid gas from an amine regenerator, sulfur, or recycled hydrogen sulfide is fed to an incinerator or a sulfur burner/reaction furnace to produce 128 tons/day of sulfur dioxide feed to the process. Thirty-four (34) tons of hydrogen sulfide in the SWSG reacts with the absorbing solution to form 222 tons/day of ATS. The other 68 tons/day of hydrogen sulfide in the SWSG are vented to be combined with a cooled gas stream downstream of a host plant's Claus unit combustion such that the rejected hydrogen sulfide can be recovered as elemental sulfur or recycled to the incinerator to produce sulfur dioxide. The ATS product produced is a 60 wt. % aqueous solution whose concentration can be controlled by the amount of make-up water added to the process and by the operating temperatures in the reaction vessels and columns 74 and 90.

The process of the present invention provides many advantages not heretofore realized in processes for producing ATS, particularly from gas streams such as SWSG streams. A typical SWSG stream contains 1 mole of ammonia:1 mole of $H_2S$:1 mol of water vapor. Accordingly, the hydrogen sulfide is present in three times the stoichiometric requirement for the reaction to produce ATS. By using the process of the present invention, the excess hydrogen sulfide is rejected and, as noted above, can be used to produce sulfur or to provide sulfur dioxide for the process. The process of the present invention is also simpler in that conventional processes to produce ammonium thiosulfate conduct the reaction in two reactors: one to react the sulfur dioxide with aqueous ammonia to form ammonium sulfite and bisulfite, the other reactor to react the product of the first reaction to ATS by reduction with sulfide ion or elemental sulfur. This requires the addition of sufficient water to keep the sulfite/bisulfite in solution, resulting in a thiosulfate concentration in the product stream well below 60%. Accordingly, to obtain a product stream of 60 wt. % ATS, the excess water has to be removed by means of additional equipment and energy expenditure. Since in the process of the present invention, the sulfite, bisulfite, and sulfide ions are promptly converted to thiosulfate, their concentrations never exceed those soluble in a concentrated solution of thiosulfate. Accordingly, the reaction is carried out at conditions that produce aqueous ATS product at or above 60 wt. % and requires no additional water removal step or expense. The aqueous ATS product stream of the present invention contains the ATS in a concentration sufficiently high such that when the solution is cooled to ambient temperature by a suitable means, such as vacuum evaporation, a substantial quantity of solid ATS is produced. This allows production of a solid ATS product by separation of the solid from the liquid by conventional means, followed by appropriate steps, such as drying, milling, and crushing.

One feature of the process of the present invention is that the unabsorbed gas from the SWSG, comprised mainly of water and $H_2S$, is rejected from the process separately from the unabsorbed gases that enter in the sulfur dioxide feed stream. In fact, experimental data shows that it is not necessary to use the unabsorbed gas stream, comprised primarily of nitrogen and oxygen, to strip the hydrogen sulfide from the absorbing liquid. As noted, an advantage to this segregation is that the unreacted hydrogen sulfide can be used as a source of sulfur to produce the sulfur dioxide without causing inert gases, such as nitrogen, to cycle in the process. Since the unabsorbed gas stream from the sulfur dioxide feed stream is primarily nitrogen, oxygen, and perhaps trace amounts of sulfur dioxide, this stream can be vented to atmosphere without any pollution concerns. Indeed, it is a feature of the present invention that all of the streams produced in the process, both liquid and gas, are salable (the ATS stream), or are useful in further reactions (conversion of hydrogen sulfide to sulfur or to sulfur dioxide), or are not environmentally deleterious (the unabsorbed nitrogen and oxygen from the sulfur dioxide feed stream can be vented to atmosphere), or can be treated for further recycle in the system via the sour water stripper, or can be sent to typical treatment systems for separating oil/water mixtures in the event that the SWSG feed stream is contaminated with organics.

The foregoing description and examples illustrate selected embodiments of the present invention. In light thereof, variations and modifications will be suggested to one skilled in the art, all of which are in the spirit and purview of this invention.

What is claimed is:

1. A process for producing ammonium thiosulfate comprising:
   (a) contacting a feed gas mixture comprising hydrogen sulfide and ammonia with an aqueous absorbing stream comprising ammonium sulfite and ammonium bisulfite in a first reaction zone to produce an ammonium thiosulfate-containing solution and a first off-gas comprising hydrogen sulfide and ammonia wherein conversion of sulfite into thiosulfate is limited by varying the aqueous absorbing stream to feed gas mixture contact ratio (L/G ratio) in response to an oxidation reduction potential of the aqueous absorbing stream;
   (b) contacting the first off-gas with water to form an ammonium bisulfide-containing solution and a second off-gas comprising hydrogen sulfide;
   (c) contacting the aqueous absorbing stream with a sulfur dioxide-containing gas in a second reaction zone to produce a second reaction zone product comprising ammonium sulfite and ammonium bisulfite;
   (d) combining at least a portion of the second reaction zone product with the ammonium thiosulfate-containing solution to produce a combined solution; and
   (e) recycling a first portion of the combined stream back to at least the first reaction zone and recovering ammonium thiosulfate from a second portion of the combined solution.

2. The process of claim 1 wherein the oxidation reduction potential is in the range of about −250 millivolts to about −450 millivolts and the L/G ratio is in the range of about 1 gal.:100 SCF to about 100 gals.:100 SCF.

3. The process of claim 1 wherein the feed gas mixture comprises a sour water stripper gas.

4. The process of claim 1 wherein the sulfur dioxide-containing gas is produced by combustion of sulfur.

5. The process of claim 1 wherein the sulfur dioxide-containing gas is produced by combustion of the second off-gas.

6. The process of claim 1 wherein the sulfur dioxide-containing gas comprises a flue gas resulting from combustion of a sulfur-containing fuel.

7. The process of claim 1 wherein the sulfur dioxide-containing gas is a product stream from a sulfur recovery unit.

8. The process of claim 1 wherein an effluent gas produced in the second reaction zone comprises nitrogen and oxygen.

9. The process of claim 1 wherein the feed gas mixture is scrubbed with the ammonium thiosulfate-containing solution in a pre-scrubber prior to contact with the aqueous absorbing stream in the first reaction zone.

10. The process of claim 1 wherein the first off-gas is passed through a water scrubber.

11. The process of claim 1 wherein the first reaction zone is a venturi scrubber.

12. The process of claim 1 wherein the second reaction zone is a venturi scrubber.

13. The process of claim 1 wherein the second portion of the combined solution contains at least 60 percent by weight ammonium thiosulfate.

* * * * *